Patented Oct. 21, 1952

2,615,002

UNITED STATES PATENT OFFICE 2,615,002

POLYAMIDE MOLDING POWDER

Marvin Joseph Hurwitz, Brooklyn, N. Y., assignor to E. I. du Pont de Nemours and Company, Wilmington, Del., a corporation of Delaware No Drawing. Application September 26, 1949, Serial No. 117,931

11 Claims. (Cl. 260—33.4)

This invention relates to polyamide molding powder and, more particularly, to a modified synthetic linear polyamide molding powder and the process of preparing the same.

The fiber-forming synthetic linear polyamides are well known and general procedures for their preparation are described in U. S. Patents 2,071,250; 2,071,253; and 2,130,948. A characteristic property of these polyamides is that they can be formed into filaments which can be cold drawn to fibers showing a molecular orientation along the fiber axis. In general, these polyamides have intrinsic viscosities of at least 0.4 where the intrinsic viscosity is as defined in U. S. Patent 2,130,948. It has been known for some time that the pliability of these polyamides may be increased by the use of various plasticizers. Among the most suitable plasticizers for these polyamides are the group of monomeric amides having a boiling point above 220° C. such as disclosed in U. S. Patent 2,214,405.

Although these polyamides having intrinsic viscosities of at least 0.4 have been used heretofore as molding powders and have been compounded with various plasticizers, little specific consideration has been given in the published literature to plasticizing polyamides where they are to be used as molding powders. In fact, the prior art procedures divide generally into those where the plasticizer is added either to the kettle in which the condensation reaction to form the polyamide is taking place, or, at least, to the molten polyamide or, going to the other extreme, to articles formed from the polyamide. Manifestly, the latter procedure can have no effect on the polyamide during the molding step and, if the article has sections of appreciable thickness, uniform distribution of the plasticizer is practically impossible whereas the former procedure excludes the use of plasticizers that would react with the polyamide forming materials unless such reaction product happens to be desired.

Regardless of how they have been plasticized, heretofore plasticized polyamides have been somewhat deficient in certain respects, noticeably in resilience and impact strength at subzero temperature. Also, the polyamide molding powders have had relatively narrow molding and extrusion temperatures which has led to difficulties in fabrication. Still further, these heretofore known polyamide compositions have not had particularly good flex life and resistance to repeated impact, properties of great importance in certain uses.

An object of the present invention is to provide an improved modified synthetic linear polyamide molding powder. A further object is to provide such a molding powder which may be converted into articles capable of withstanding service at low temperatures. A further object is to provide such a molding powder which may be converted into tough, impact-resistant articles having unique elastomeric or rubbery properties. Another object is to provide an economical process of preparing such molding powders. Other objects will be apparent from the description of the invention given hereinafter.

The above objects are accomplished according to the present invention by providing a molding powder comprising a synthetic linear polyamide having an intrinsic viscosity of at least 0.4, uniformly plasticized with 5% to 100%, by weight of the polyamide, of a saturated aliphatic diol having a boiling point above 150° C., a molecular weight between 75 and 220, and a maximum of 9 atoms in a straight chain between the two hydroxyl groups.

This molding powder may be prepared by incorporating the diol into the preformed polyamide by known techniques such as milling on hot rolls, mixing in a Banbury mixer, working in a plasticator or the like. However, the present invention further comprises preparing the molding powder by agitating the polyamide in finely-divided form with the diol at a temperature of 20° C. up to the melting point of the polyamide until the diol has been absorbed by the polyamide. Preferably, this is carried out in a closed container at a temperature of 70° C.–100° C., the time required normally being between one-quarter and one hour. At this preferred temperature it has been found that each individual particle of polyamide remains intact as a particle and is individually and uniformly plasticized so that the product is suitable directly without further treatment for use as a free flowing, granular molding powder.

The present invention resides to an important degree in the discovery that synthetic linear polyamides in general when plasticized uniformly with the herein characterized diols not only possess advantageous properties at normal temperatures, particularly improved resilience, but retain these properties to an unexpected degree at sub-zero temperatures. Moreover, it has been found that a certain group of interpolyamides when uniformly plasticized with these diols not only have the favorable properties of other plasticized polyamides but, in addition, possess elastomeric or rubbery properties to a unique extent, as evidenced in an article molded therefrom, in a reduction in stiffness, greater elongation, excellent flex life and resistance to repeated impact and quick recoevery after deformation, properties of great value in certain articles.

The interpolyamides adapted for use in the preferred form of this invention are the interpolycondensation products of a mixture (A), by weight, of 20% to 60% caprolactam and at least 10% of each of two different salts of hexamethylenediamine and a saturated aliphatic dicarboxylic acid having from 4 to 8 carbon atoms, inclusive, between carboxyl groups, and interpolycondensation products of a mixture, (B), by weight, of 20% to 40% caprolactam, 35% to 55% of the salt of hexamethylenediamine and a saturated aliphatic dicarboxylic acid having from 4 to 8 carbon atoms, inclusive, between carboxyl groups, and 15% to 40% of the salt of a dialicyclic diamine, having the formula

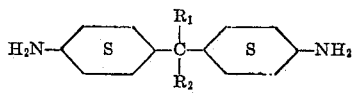

wherein $R_1$ and $R_2$ are selected from the group consisting of hydrogen atoms and methyl radicals, and a saturated aliphatic dicarboxylic acid having from 4 to 8 carbon atoms, inclusive, between carboxyl groups, S being the conventional designation that the ring carbon atoms are saturated with hydrogen.

Preferred molding powder compositions are obtained according to the present invention by using interpolyamides which are interpolycondensation products of a mixture (C), by weight, of 30% to 45% caprolactam, 10% to 50% hexamethylenediammonium adipate, and 10% to 45% hexamethylenediammonium sebacate, and interpolycondensation products of a mixture (D), by weight, of 22% to 37% caprolactam, 40% to 50% of the salt of hexamethylenediamine and a saturated aliphatic dicarboxylic acid having from 4 to 8 carbon atoms, inclusive, between carboxyl groups and, 20% to 35% of the salt of bis(4-aminocyclohexyl) methane and a saturated aliphatic dicarboxylic acid having from 4 to 8 carbon atoms, inclusive, between carboxyl groups. The interpolycondensation products of mixtures (C) and (D) are more restricted groups of products under (A) and (B), respectively.

The following examples in which all proportions are by weight unless otherwise stated, illustrate the invention more specifically.

EXAMPLE I

This example illustrates the relatively low stiffness of polyamides at sub-zero temperatures when plasticized according to the present invention. A series of polyamide compositions were prepared as molding powders, molded into test bars, and tested according to ASTM D747–43T to determine the stiffness in pounds per square inch at the temperatures indicated in Table I below.

The polyamide hereinafter designated "W" was an interpolyamide having an intrinsic viscosity of 1.35 and was obtained by the interpolycondensation of 40 parts hexamethylenediammonium adipate, 30 parts hexamethylenediammonium sebacate, and 30 parts caprolactam, according to Example I of U. S. Patent 2,285,009.

The interpolyamide hereinafter designated "X" was an interpolyamide having an intrinsic viscosity of 1.27 and was obtained by the interpolycondensation at polyamide-forming temperature under conditions essentially the same as those specified in Example VI of British Patent 619,707 of a mixture of 28.6 parts of the salt of bis(4-aminocyclohexyl) methane and adipic acid, 42.8 parts of hexamethylenediammonium adipate, and 28.6 parts of caprolactam.

The polyamide hereinafter designated "Y" was an interpolyamide having an intrinsic viscosity of 1.3 and was obtained by the interpolycondensation at polyamide-forming temperature under conditions essentially the same as those specified in Example VI of British Patent 619,707, of a mixture of 33.3 parts of the salt of bis(4-aminocyclohexyl) methane and sebacic acid, 33.3 parts of hexamethylenediammonium adipate, and 33.3 parts of caprolactam.

The polyamide hereinafter designated "Z" was an interpolyamide having an intrinsic viscosity of 1.25 and was obtained by the interpolycondensation at polyamide-forming temperature under conditions essentially the same as those specified in Example VI of British Patent 619,707, of a mixture of 33.3 parts of the salt of bis (4-aminocyclohexyl) methane and adipic acid, 33.3 parts of hexamethylenediammonium adipate, and 33.3 parts of caprolactam.

The bis (4-aminocyclohexyl) methane used in preparing the salts for synthesis of polyamides X, Y, and Z above, was a stereoisomeric mixture, liquid at 25° C., and was prepared according to Example IV of British Patent 619,706.

A series of polyamide compositions as indicated in Table I was prepared using 2-ethylhexanediol-1,3 in various proportions with polyamides W, X, Y, and Z. These compositions were prepared by tumbling the interpolyamide in the form of ¼" cubes with the plasticizer in a closed container for about 15 minutes, followed by heating to 70° C. for 60 minutes to allow the diol to be absorbed by the interpolyamide. In each case the uniformly plasticized, finely-divided dry particles of interpolyamide were fed to a conventional plastics extrusion machine and the composition extruded in the form of a rod which in turn was comminuted to molding powder. This molding powder was injection molded into test bars measuring 2.5" x 0.125" x 0.5".

For purposes of comparison a composition was also prepared of polyamide W plasticized with "Santicizer" 8, one of the best prior art plasticizers consisting of a mixture of o- and p-toluene ethyl sulfonamides. This composition was made by mixing plasticizer and polyamide together with 0.5% of sodium stearate by weight of the plasticized polyamide in a Banbury mixer for 15 minutes at 120° C.–150° C. The sodium stearate was simply added as a lubricant to facilitate mixing. The thoroughly mixed composition was then cooled and comminuted in a Ball and Jewell cutter to a finely-divided molding powder which was injection molded into test bars of the same dimension as those above. This particular composition could not be prepared as those using 2-ethylhexanediol-1,3 were since "Santicizer" 8 is not adapted to be used in accordance with the preferred procedure of this invention. The difference in methods of preparation, however, does not affect the results as tabulated below.

The test bars were each tested according to the aforementioned ASTM D747–43T at the temperatures indicated in Table I to determine the stiffness in pounds per square inch.

*Table I*

| Composition | | Stiffness×10⁻³, p. s. i.— | | |
|---|---|---|---|---|
| Polyamide (Parts) | Plasticizer (Parts) | 25° C. | −20° C. | −35° C. |
| 77.5 W | 22.5 2-ethylhexanediol-1,3 | 20.4 | 49.4 | 107.2 |
| 80 W | 20 2-ethylhexanediol-1,3 | 18.7 | 37.9 | 151.0 |
| 82.5 W | 17.5 2-ethylhexanediol-1,3 | 19.6 | 57.8 | 165.0 |
| 85 W | 15 2-ethylhexanediol-1,3 | 22.8 | 67.7 | 207.0 |
| 87.5 W | 12.5 2-ethylhexanediol-1,3 | 21.8 | 88.9 | 201.0 |
| 90 W | 10 2-ethylhexanediol-1,3 | 24.6 | 115.8 | 282.0 |
| 92.5 W | 7.5 2-ethylhexanediol-1,3 | 27.3 | 174.0 | 330.0 |
| 82.5 W | 17.5 "Santicizer" 8 | 19.5 | 236.0 | 352.0 |
| 100 W | no plasticizer (control) | 46.5 | 271.0 | 285.0 |
| 80 X | 20 2-ethylhexanediol-1,3 | 15.0 | 63.0 | 140.0 |
| 100 X | no plasticizer (control) | 29.0 | 370.0 | 410.0 |
| 70 Y | 30 2-ethylhexanediol-1,3 | 20.0 | 11.0 | 60.0 |
| 100 Y | no plasticizer (control) | 174.0 | 310.0 | 330.0 |
| 70 Z | 30 2-ethylhexanediol-1,3 | 20.0 | 15.0 | 61.0 |
| 100 Z | no plasticizer (control) | 174.0 | 310.0 | 330.0 |

The results in the above table illustrate how much more effective the herein considered diols are in imparting reduced stiffness to these polyamides at sub-zero temperatures as compared to a polyamide either unplasticized or plasticized with "Santicizer" 8. Also, the series of compositions employing polyamide W show the effect of varying the proportion of diol. It is noticeable that when roughly at least 15%, by weight of the polyamide, of the diol plasticizer (87.5 parts polyamide W to 12.5 parts of 2-ethylhexanediol-1,3 in Table I), is used, the stiffness at sub-zero temperatures rises at a markedly lower rate than when lower proportions of diol plasticizer are used.

These diols are also highly effective in reducing the stiffness of the simpler polyamides which are inherently stiffer, as shown by tests on similarly prepared bars of polyhexamethylene adipamide and sebacamide plasticized with 2-ethylhexanediol-1,3. For example, polyhexamethylene adipamide plasticized with only 5%, by weight thereof, of the diol, had a stiffness at 25° C. of 121,000 as compared to an unplasticized control having a stiffness of 290,000 and polyhexamethylene sebacamide plasticized with only 5%, by weight thereof, of the diol, had a stiffness at 25° C. of 54,500 as compared to an unplasticized control having a stiffness of 152,000, this favorable comparison being well retained at sub-zero temperatures.

EXAMPLE II

This example illustrates the comparative effectiveness of the diol plasticizers on bars made up as in Example I with respect to impact strength. In Table II are tabulated results in determining the Izod impact strength in foot pounds per inch of notch in accordance with ASTM D256–43T.

*Table II*

| Composition | | Izod Impact strength | | |
|---|---|---|---|---|
| Polyamide (Parts) | Plasticizer (Parts) | 25° C. | 0° C. | −18° C. |
| 77.5 W | 22.5 2-ethylhexanediol-1,3 | no break | no break | no break. |
| 80 W | 20 2-ethylhexanediol-1,3 | do | do | Do. |
| 82.5 W | 17.5 2-ethylhexanediol-1,3 | do | do | Do. |
| 85 W | 15 2-ethylhexanediol-1,3 | do | do | {50% no break. 50% partial breaks. |
| 87.5 W | 12.5 2-ethylhexanediol-1,3 | do | do | 100% partial breaks. |
| 90 W | 10 2-ethylhexanediol-1,3 | do | do | {40% partial breaks. 60% brittle breaks. |
| 92.5 W | 7.5 2-ethylhexanediol-1,3 | do | do | {100% brittle breaks. 1.0 ft. lb./in. |
| 82.5 W | 17.5 "Santicizer" 8 | do | do | {100% brittle breaks. 0.80 ft. lb./in. |
| 100 W | no plasticizer (control) | partial break | partial break | {100% brittle breaks. 1.84 ft. lb./in. |

The results above illustrate that at sub-zero temperatures the diols are more effective than "Santicizer" 8 with respect to impact strength. Also, these results indicate that when roughly at least 15%, by weight of the polyamide, of the diol plasticizer is used, the impact strength at low temperatures increases relatively rapidly.

EXAMPLE III

This example illustrates the superiority of a diol plasticized interpolymer according to this invention over the same interpolyamide plasticized with sulfonamide plasticizers in so far as flex life is concerned.

The polyamide W of Example I was mixed with the amounts of plasticizers indicated in Table III in a Banbury mixer followed by cutting in a Ball and Jewell cutter according to the procedure given in connection with the preparation of the "Santicizer" 8-polyamide composition in Example I. The finely-divided plasticized molding powder was then extruded through a flat sheeting die to give sheets having the thickness indicated in Table III, the temperature of the cylinder of the extrusion machine being maintained at approximately 180° C.

The flex life of each sample of sheeting was measured at 25° C. and expressed as the number of cycles to failure, determined according to the test described by Duggan and Fligor, Ind. Eng. Chem. 35, 172 (1943). Samples 2.5" x 5" x thickness indicated in Table III were mounted for transverse flexing of sheeting folded longitudinally.

*Table III*

| Composition | | Thickness of Sheeting, mils | Cycles to Failure |
|---|---|---|---|
| Polyamide (Parts) | Plasticizer (Parts) | | |
| 85 W | 15 "Santicizer" 8 | 0.028 | 20,000-30,000 |
| 80 W | 20 "Santicizer" 8 | 0.020-.030 | 20,000-30,000 |
| 85 W | 15 "Santicizer" 9 [1] | 0.023 | 57,500 |
| 85 W | 15 2-ethylhexanediol-1,3 | 0.024 | 148,000 |
| | | 0.027 | 460,000 |
| 80 W | 20 2-ethylhexanediol-1,3 | 0.029 | 460,000 |
| | | 0.030 | 850,000 |

[1] Mixture of o- and p-toluene sulfonamides.

EXAMPLE IV

This example illustrates the resilience and elastomeric properties of polyamide compositions made according to the present invention.

Various molding powder compositions as indicated in Table IV below were prepared in a Banbury mixer followed by cutting in a Ball and Jewell cutter according to the procedure given in connection with the preparation of the "Santicizer" 8-polyamide composition in Example I. These were then injection molded at 160° C. into test strips measuring 2.25" x 0.125" x 0.060".

The molded test strips were then used in a test to obtain the damping numbers given in Table IV. This test was carried out at 25° C. by mounting the molded test strip in a clamp between two vertical pieces of metal with slits in their centers. The strip was deflected a measured amount, the load causing the deflection was then removed, and the test strip allowed to vibrate. A flag fastened at the end of the strip vibrated in front of the strip and this motion was recorded on an oscillograph screen. The amplitude of the vibrations is dependent on the stiffness of the test strips as well as the dimensions. But the number of vibrations of the strip before it comes to rest is independent, for the most part, of those considerations and is a measure of how soon the potential energy imparted to the strip is absorbed by it. Thus, the higher the "damping number" (cycles before the strip comes to rest), the more rubbery is the material.

*Table IV*

Damping number
a. Polyamide W containing no plasticizer ____ 6
b. 87 parts polyamide W and 13 parts of a mixture of o- and p-toluene N-ethylsulfonamides ____ 7
c. 87 parts polyamide W and 13 parts of a mixture of o- and p-toluene sulfonamides ____ 4
d. 80 parts polyamide W and 20 parts p-toluene sulfonanilide ____ 4
e. 80 parts polyhexamethylene sebacamide and 20 parts 2-ethylhexanediol-1,3 ____ 10
f. 80 parts polyamide W and 20 parts 2-ethylhexanediol-1,3 ____ 16
g. 80 parts polyamide W and 20 parts dithiodiglycol ____ 16
h. 90 parts polyamide W and 10 parts hexamethylene glycol ____ 15
i. 80 parts polyamide W and 20 parts tetramethylene glycol ____ 22
j. 80 parts polyamide W and 20 parts trimethylene glycol ____ 17
k. 90 parts polyamide W and 10 parts trimethylene glycol ____ 16

Composition a is a control sample and compositions b, c, and d are representative of the prior art and have been included for purposes of comparison. Thus it will be seen that the three prior art plasticizers give no appreciable increase in the resilience of the polyamide and, in the case of c and d, a definite decrease.

Composition e falls within the scope of the present invention but polyhexamethylene sebacamide is not one of the preferred polyamides which shows such a surprisingly marked increase in elastomeric properties when plasticized according to the present invention. However, composition e does show some increase in resiliency. The remaining compositions are all preferred embodiments and show approximately a 3-fold increase in resiliency. Compositions f to k, all using interpolyamide W, show the great increase in resiliency which results characteristically without too great variation even when using different diols and in varying proportions. For example, a test strip of a composition made up to 70 parts of polyamide X and 30 parts of 2-ethylhexanediol-1,3 has a damping number similar to that of compositions f, g, h, j, and k in the above table.

The above examples are merely illustrative and the invention broadly comprises a molding powder comprising a synthetic linear polyamide having an intrinsic viscosity of at least 0.4, uniformly plasticized with 5% to 100%, by weight of the polyamide, of a saturated aliphatic diol having a boiling point above 150° C., a molecular weight between 75 and 220, and a maximum of 9 atoms in a straight chain between the two hydroxyl groups. The invention also comprises the particular method of preparing the molding powder composition as exemplified in Example I.

The invention is broadly applicable to synthetic linear polyamides having an intrinsic viscosity of at last 0.4. Polyamides of lower intrinsic viscosity are not well adapted for molding powders and, preferably, the polyamide will have an intrinsic viscosity of at least 1.0 determined according to the procedure set forth in U. S. Patent 2,130,948. The invention is of value as applied to synthetic linear polyamides of various types but, as previously indicated, it is of particular value with respect to interpolyamides of the two classes described above.

The particular conditions for the condensation reaction in the preparation of the preferred interpolyamides are disclosed in the various patents hereinabove mentioned, it being understood that the reactants should be heated at a sufficiently high temperature and for a sufficient period to give interpolyamides having an intrinsic viscosity of at least 0.4.

Insofar as this invention is concerned, it is immaterial whether the interpolyamide is formed through the condensation of caprolactam and the diaminedicarboxylic acid salts or equivalent amide-forming derivatives thereof since the interpolyamide formed is the same in either case. For example, molecularly equivalent amounts of 6-aminocaproic acid may be used in place of the caprolactam, and amide-forming derivatives of the diamine such as the carbamates, and amide-forming derivatives of the dicarboxylic acids such as the monoesters and anhydrides, may be used in place of the diamines and dicarboxylic acids, respectively, to form the salts.

The diamine dicarboxylic acid salts need not be preformed but, alternatively, the diamines and the dicarboxylic acids to form one or both of the salts for the condensation reaction may be added directly to the reaction kettle along with the caprolactam, reasonable care being taken in such instances to add diamines and dicarboxylic acids in equimolecular proportions. In preparing the preformed salts equimolecular amounts of the diamine and acid may be used or an excess of either since the resulting salt will consist of equimolecular amounts of the two. The diamine may consist of a mixture of two or more diamines such as the stereoisomeric mixture used in the preparation of polyamides X, Y, and Z in Example I and, also, the dicarboxylic acid may consist of a mixture of two or more acids such as a mixture of suberic and azelaic acids.

The preferred interpolyamides include, in addition to those disclosed in the examples, the interpolycondensation products of: 35 parts hexamethylenediammonium adipate, 40 parts caprolactum and 25 parts hexamethylenediammonium sebacate; 40 parts hexamethylenediammonium adipate, 25 parts caprolactam, 10 parts hexamethylenediammonium suberate and 25 parts hexamethylenediammonium azelate; 30 parts of the salt of 2,2-di(4-aminocyclohexyl) ethane and adipic acid, 30 parts caprolactam and 40 parts hexamethylenediammonium sebacate; 40 parts of the salt of bis (4-aminocyclohexyl) methane and sebacic acid, 25 parts caprolactam and 35 parts hexamethylenediammonium adipate; 15 parts of the salt of bis (4-aminocyclohexyl) methane and sebacic acid, 35 parts 6-aminocaproic acid and 50 parts hexamethylenediammonium sebacate. The preparation of these interpolyamides is known in the art and does not form a part of the present invention.

The diols suitable for use in this invention are those hereinabove characterized. These diols should be liquids at the temperature at which they are mixed with the polyamide and, preferably, liquid at 20° C. In so far as known, all of the diols herein contemplated are liquids at 20°. The minimum molecular weight of the diol is dictated by volatility whereas the maximum molecular weight and the limitation of the number of atoms between hydroxyl groups is fixed by compatibility of the diol in the polyamide. In other words, diols other than the limited class referred to above will plasticize the polyamides of this invention, but the utility of the plasticized compositions is rather low and the advantage of the unique rubbery property is offset by other disadvantages. For example, if the diol is too volatile, it may be lost at processing temperatures, and if the diol is not sufficiently compatible with the polyamide, it will exude. The presence of O, S, and N linkages in the diol does not prevent the conference of the rubbery property to the polyamide. However, in some cases when these linkages exist in the straight chain connecting the hydroxyl groups, the water sensitivity of the diol is increased to a point which is undesirable in certain applications for the plasticized polyamides.

More specifically, the invention contemplates using a saturated aliphatic diol, which is liquid below 150° C., having at least one primary hydroxyl group and a molecular weight of 100 to 200, containing from 2 to 6 atoms between hydroxyl groups in a straight chain, the only oxygen atoms being either hydroxyl or ether oxygen, and the C:O ratio being from 2 to 5.

The preferred class of diols for use in this invention, because of the fact that the members of this group impart the optimum combination of other properties to the plasticized polyamides in addition to the unique elastomeric property, is the class of saturated aliphatic diols, which are liquid below 150° C., having at least one primary hydroxyl group and a molecular weight of 130 to 180, containing from 2 to 6 carbon atoms between hydroxyl groups in a straight chain, and the only atoms in the molecule are carbon, hydrogen, and oxygen, the oxygens being either hydroxyl or ether oxygens, and the C:O ratio being from 3 to 4:1, there being no oxygen in the straight chain between the two hydroxyl groups. The members of this preferred group of diols are less volatile and more compatible with the polyamides and do not tend to leach out of the polyamides (i. e., are less water-sensitive).

Specific diols other than those disclosed in the examples, adapted for use in the invention include: diethylene glycol; triethylene glycol; diethanolamine; 2,2-diethylpropanediol-1,3; pentamethylene glycol; hexamethylene glycol; heptamethylene glycol; octamethylene glycol; nonamethylene glycol; heptanediol-2,4; 2-methylpentanediol-2,4; 2-methylbutanediol-1,3; 3-methoxyhexanediol-1,6; 3-methylol-4-hydroxynonane; 3-ethyloctanediol-1,8; 2,4-diethylpentanediol-1,5; 3-ethoxy-3-ethylhexanediol-1,6; and di (betahydroxyethyl) formal. The preferred group of diols having a molecular weight of 130 to 180 are exemplified by 2-ethylhexanediol-1,3; 3-methylhexanediol-1,6; 3-ethylhexanediol-1,6; 4-methylheptanediol-1,4; 2-ethylhexanediol-1,6; 3-methoxy-3-ethylhexanediol-1,6; and 2-ethyl-4-ethoxypentanediol-1,5.

The proportion of diol in the molding powder of this invention may vary from 5% to 100% by weight of the polyamide. Below 5%, there is not sufficient diol present to gain appreciable advantage of the invention while in excess of 100% is normally undesirable because of exudation of the diol from the polyamide. Preferably, at least about 15% diol should be present, especially where the preferred interpolyamides are used, as the rubbery characteristic of the composition is less pronounced below that proportion; also, there is improvement in other properties as 15% diol, by weight of the polyamide, is reached. A proportion of 45% diol approximately marks the point above which there does not appear to be any further appreciable improvement in properties of the composition ordinarily desired.

A single diol may be used or a combination of two or more but the above proportions are with respect to the total diol content. Also, other plasticizers may be used with the diols provided that the other plasticizer content does not exceed 20% by weight of the diol used. For obtaining a composition exhibiting elastomeric properties in high degree and having outstanding sub-zero temperature utility, it is greatly preferred that no other plasticizer be used, however.

Except that they may be added in small proportion as special modifiers, the molding powder of this invention does not include diols other than those herein characterized or other polyols. The polyols higher than the diols possess greater water solubility and tend to increase the water sensitivity of the plasticized polyamides to an objectionable degree although all of the polyols, in general, do tend to confer elastomeric properties on these polyamides. On the other hand, the aliphatic monohydric alcohols such as 2-ethylhexyl alcohol, n-hexyl alcohol, monoethanolamine, and dodecyl alcohol, do not measurably confer elastomeric properties even on the preferred interpolyamides. Aromatic alcohols and polyols such as benzyl alcohol and 2-phenylpropanediol-1,3 do not appreciably increase the resilience of these polyamides.

The molding powder of this invention essentially consists of polyamide and diol plasticizer but small amounts of other material such as pigments, fillers, anti-oxidants, metal deactivators, heat and light stabilizers, lubricants, resins and the like may be included as will be understood by those skilled in the art.

The diol may be incorporated in the polyamide by any known technique provided it is added to the preformed polymer, i. e., it should not be added while the condensation reaction to form the polyamide is in progress. Also, the melt blending technique, i. e., mixing the diol with the polyamide at a temperature above the melting point of the latter, is not desirable as at such high temperatures the polyamides may be degraded and/or the diols may volatilize or decompose. These diols are apparently unique in that they are rapidly and uniformly absorbed by the polyamide in granular form without causing caking so that it is preferred to combine the diol and plasticizer simply by agitating the two together and allowing the diol to soak in. Sufficient agitation to keep the liquid diol from collecting in the bottom of the container used is all that is necessary and this may be readily accomplished by use of a light stirrer, by tumbling, or the like as contrasted to the severe mastication of the Banbury mixer or working in a plasticator. This preferred technique means less loss of plasticizer, more rapid and cheaper mixing cycles, no lubricants are necessary as mixing aids, and that the resulting plasticized polyamide may be molded, extruded, or otherwise fabricated into useful articles without any further processing.

The conditions for this so-called "soaking" technique comprise adding the liquid diol and divided polyamide to a container, preferably sealing the container, and, while agitating the contents of the container, maintaining the container at a temperature of 20° C. to the melting point of the polyamide until the diol has been uniformly absorbed by the polyamide. The present invention comprises in part carrying out this procedure at a temperature of 70° to 100° C. until the polyamide has been absorbed, normally a period of 15 minutes to 1 hour. By carrying out the soaking within this temperature range, the polyamide particles are quite uniformly plasticized and yet do not become caked but remain as individual particles of polyamide. In this manner, the polyamide is obtained directly in a form suitable for use as a molding powder although it may be desirable to further work the polyamide in a plasticator or extrusion machine to insure optimum homogeneity and thereafter extrude the plastic and comminute it to a molding powder.

The preferred invention is not restricted to any specific size and shape of the particles making up the molding powder as any of the conventional molding powders are contemplated. For example, the molding powder may be cubecut, spheroidal, or Ball and Jewell cut. Normally, the molding powder will be in the form of particles having a maximum dimension of 0.75" although this is not a critical limitation.

An advantage of this invention is that it provides polyamide molding powder having an elastomeric or rubbery property to a unique degree not obtainable heretofore. Further, this molding powder gives articles possessing low stiffness, great impact resistance, good low temperature stiffness, toughness and impact resistance (at as low as −50° C.), excellent flex life, good resistance to repeated impact, and relatively low deformation under load. This combination of properties has not been achieved in either plasticized or unplasticized polyamides heretofore. Articles made from the instant molding powder find maximum use at room temperature and below, particularly at sub-zero temperatures. The molding powder also possesses wider molding and extrusion temperature ranges than unmodified polyamides.

The molding powder of this invention is useful for fabrication into both molded articles and extruded articles such as films, sheets, monofilaments and the like. Specific finished articles for which the molding powder is particularly useful, include loom pickers, yarns, fishing leaders, briefcases, packaging and wrapping films, hammerheads, coatings and coverings for wires and cables, rattans, bristles, tennis string, industrial belting, seat covers, suspenders, shoe soles and heels, and wristwatch straps.

As many apparently widely different embodiments of this invention may be made without departing from the spirit and scope thereof, it is to be understood that the invention is not limited to the specific embodiments thereof except as defined in the appended claims.

The invention claimed is:

1. A molding powder comprising a synthetic linear polyamide having an intrinsic viscosity of at least 0.4, uniformly plasticized solely with a plasticizer consisting of at least 83%, by weight of a saturated aliphatic diol having a boiling point above 150° C., a molecular weight between 75 and 220, and a maximum of 9 atoms in a straight chain between the two hydroxyl groups, the proportion of plasticizer being such that said molding powder contains 15% to 100% by weight of said polyamide, of said diol.

2. A molding powder as set forth in claim 1 wherein said diol contains at least one primary hydroxyl group, has a molecular weight between 100 and 200, has 2 to 6 atoms, inclusive, in a straight chain between the hydroxyl groups, has only oxygen atoms from the group consisting of hydroxyl and ether oxygen atoms, and has a ratio of one oxygen atom to 2 to 5 carbon atoms, inclusive.

3. A molding powder as set forth in claim 1 wherein said diol contains at least one primary hydroxyl group, has a molecular weight between 130 and 180, has 2 to 6 carbon atoms, inclusive, in a straight chain between the hydroxyl groups, has only carbon, hydrogen, and oxygen atoms in the molecule, said oxygen atoms being from the group consisting of hydroxyl and ether oxygen atoms, and no oxygen atoms in the straight chain between the hydroxyl groups, and has a ratio of one oxygen atom to 3 to 4 carbon atoms, inclusive.

4. A molding powder comprising a synthetic linear polyamide having an intrinsic viscosity of at least one, uniformly plasticized with 15% to 45%, by weight of said polyamide, of 2-ethylhexanediol-1,3.

5. A molding powder as set forth in claim 1 wherein said polyamide is an interpolyamide from the group consisting of interpolycondensation products of a mixture, by weight, of 20% to 60% caprolactam and at least 10% of each of two different salts of hexamethylenediamine and a saturated aliphatic dicarboxylic acid having from 4 to 8 carbon atoms, inclusive, between carboxyl groups, and interpolycondensation products of a mixture, by weight, of 20% to 40% caprolactam, 35% to 55% of the salt of hexamethylenediamine and a saturated aliphatic dicarboxylic acid having from 4 to 8 carbon atoms, inclusive, between carboxyl groups, and 15% to 40% of the salt of a dialicyclic diamine, having the formula

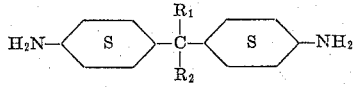

wherein $R_1$ and $R_2$ are selected from the group consisting of hydrogen atoms and methyl radicals, and a saturated aliphatic dicarboxylic acid having from 4 to 8 carbon atoms, inclusive, between carboxyl groups.

6. A molding powder as set forth in claim 1 wherein said linear polyamide is the interpolycondensation product of a mixture of 30% to 45% caprolactam, 10% to 50% hexamethylenediammonium adipate, and 10% to 45% hexamethylenediammonium sebacate.

7. A molding powder as set forth in claim 1 wherein said polyamide is an interpolycondensation product of a mixture of 22% to 37% caprolactam, 40% to 50% of the salt of hexamethylenediamine and a saturated aliphatic dicarboxylic acid having from 4 to 8 carbon atoms, inclusive, between carboxyl groups and, 20% to 35% of the salt of bis(4-aminocyclohexyl) methane and a saturated aliphatic dicarboxylic acid having from 4 to 8 carbon atoms, inclusive, between carboxyl groups.

8. A molding powder essentially consisting of an interpolycondensation product of a mixture of 30% to 45% caprolactam, 10% to 50% hexamethylenediammonium adipate, and 10% to 45% hexamethylenediammonium sebacate, said interpolycondensation product having an intrinsic viscosity of at least 1.0, uniformly plasticized with 15% to 45%, by weight of said interpolycondensation product, of 2-ethylhexanediol-1,3.

9. A molding powder essentially consisting of 80 parts of the interpolycondensation product of a mixture of, approximately, 30% caprolactam, 40% hexamethylenediammonium adipate, and 30% hexamethylenediammonium sebacate, said interpolycondensation product having an intrinsic viscosity of at least 1.0, uniformly plasticized with approximately 20 parts of 2-ethylhexanediol-1,3.

10. A process of preparing molding powder which comprises agitating a mixture essentially consisting of a synthetic linear polyamide having an intrinsic viscosity of at least 0.4, in granular form and 15% to 100%, by weight of said polyamide, of a saturated aliphatic diol having a boiling point above 150° C., a molecular weight between 75 and 220, and a maximum of 9 atoms in a straight chain between the two hydroxyl groups, at a temperature of 70° C.–100° C. until said diol has been absorbed by said polyamide.

11. A molding powder comprising a synthetic linear polyamide having an intrinsic viscosity of at least 0.4, uniformly plasticized solely with 15% to 100%, by weight of said polyamide, of a saturated aliphatic diol having a boiling point above 150° C., a molecular weight between 75 and 220, and a maximum of 9 atoms in a straight chain between the two hydroxyl groups.

MARVIN JOSEPH HURWITZ.

REFERENCES CITED

The following references are of record in the file of this patent:

UNITED STATES PATENTS

| Number | Name | Date |
|---|---|---|
| 2,216,835 | Carothers | Oct. 8, 1940 |
| 2,373,347 | Schoenfeld | Apr. 10, 1945 |
| 2,419,277 | Moncrieff | Apr. 22, 1947 |
| 2,447,398 | Supinski | Aug. 17, 1948 |